United States Patent [19]

Amelio

[11] 4,067,110
[45] Jan. 10, 1978

[54] THUMB FINGER HOLE POSITIONING DEVICE FOR BOWLING BALLS

[76] Inventor: Anthony Amelio, 5424 New Castle Ave., Apt. No. 107, Encino, Calif. 91316

[21] Appl. No.: 643,343

[22] Filed: Dec. 22, 1975

[51] Int. Cl.² .................... G01B 5/00; G01B 5/14
[52] U.S. Cl. .................................................. 33/174 F
[58] Field of Search ................ 33/174 F; 273/63 B

[56] References Cited

U.S. PATENT DOCUMENTS

| 2,714,256 | 8/1955 | Watson | 33/174 F |
|---|---|---|---|
| 2,976,616 | 3/1961 | Doyle | 33/174 F |
| 3,137,074 | 6/1964 | Jesonis | 33/174 F |
| 3,225,448 | 12/1965 | Dorey | 33/174 F |
| 3,389,475 | 6/1968 | Sapelak | 33/174 F |

Primary Examiner—Richard E. Aegerter
Assistant Examiner—Richard R. Stearns

[57] ABSTRACT

A bowling ball shaped device having a hollow interior and appropriate cut out wall portions with three receptacles, adjustably mounted therein, with plugs, removably disposed in the respective receptacles, provided with holes fitted to the thumb and two fingers of a bowler. A first adjustment means is provided to laterally adjust the position of the thumb hole receptacle, a second adjustment means pivotally adjusts the thumb hole receptacle toward and away from the finger holes, third and fourth adjustment means, individually pivot the pair of finger hole receptacles toward and away from the thumb hole receptacle, and a fifth adjustment means is individually provided for both of the finger hole and thumb hole receptacles whereby each of said receptacles may be circularly rocked about its inner end and locked in any desired outwardly diverging angular relationship to its normal radial axis. Gauge means is also provided to record said angular relationship.

15 Claims, 13 Drawing Figures

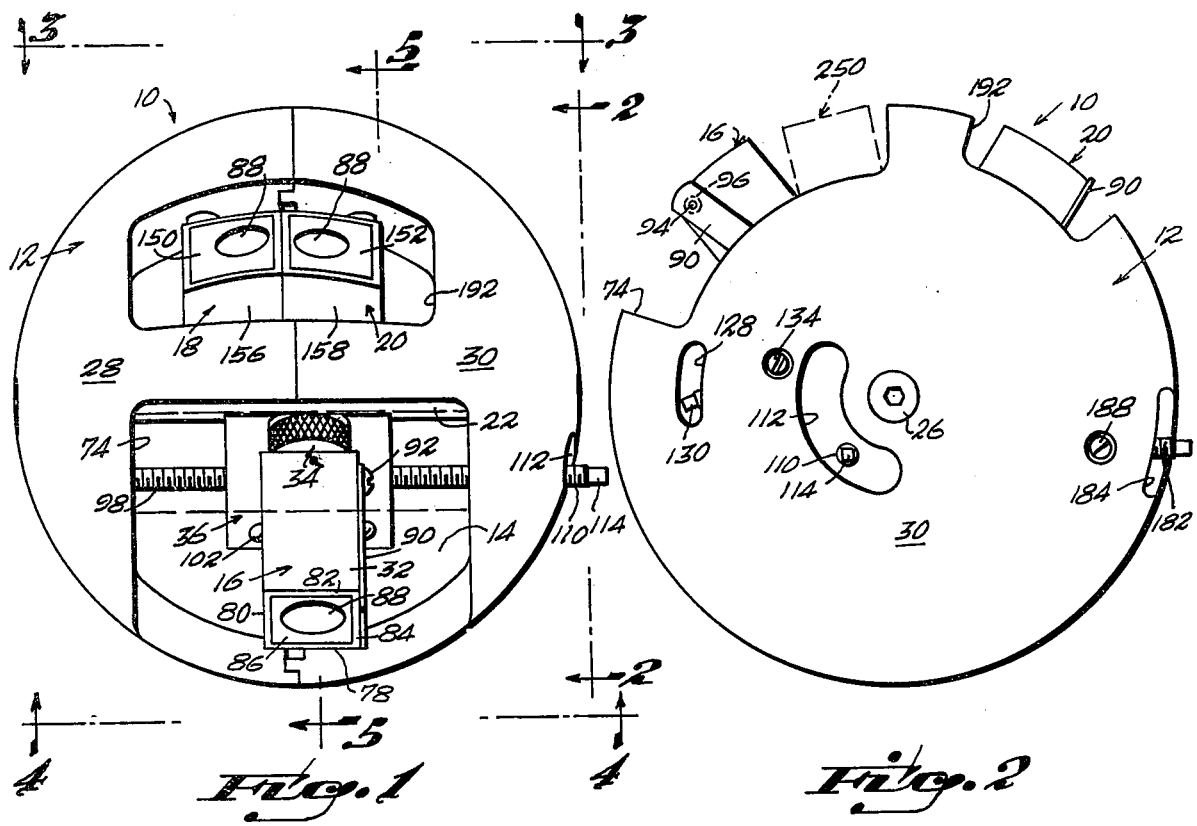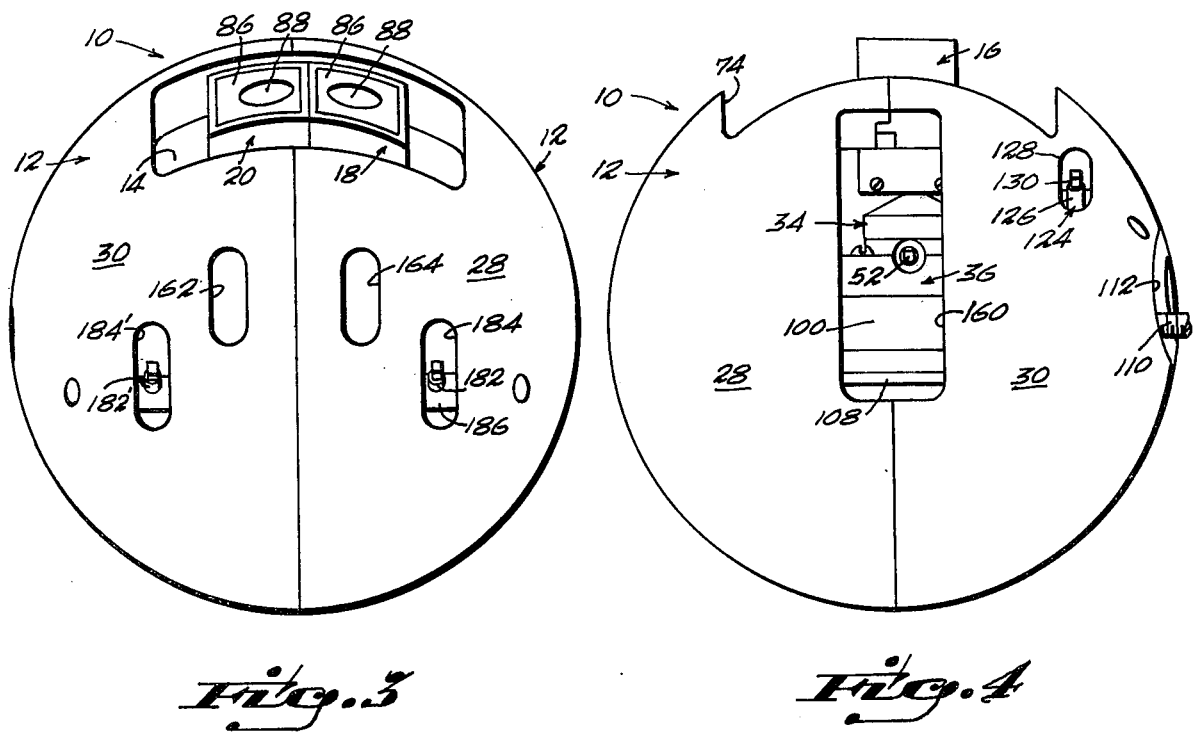

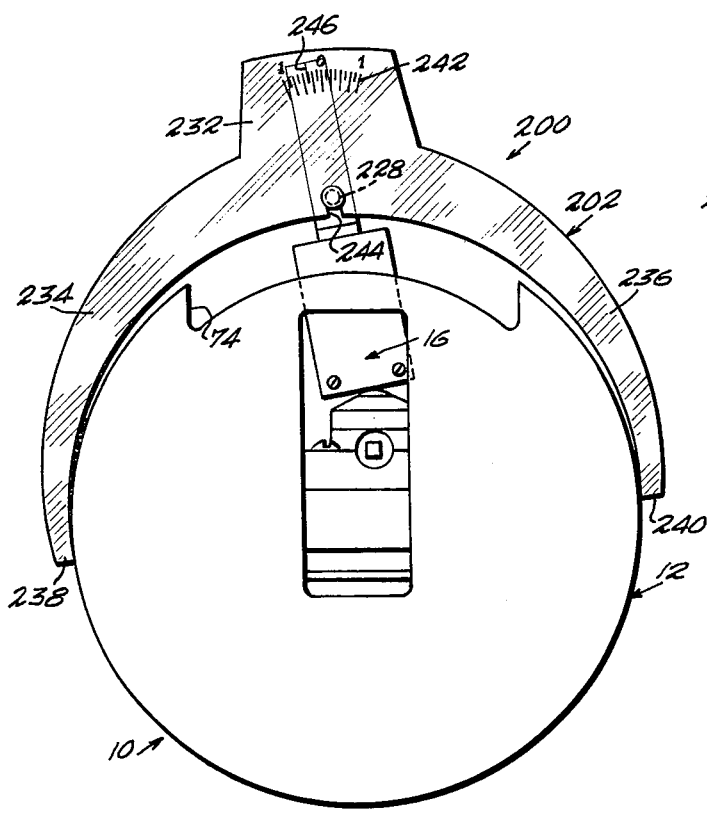
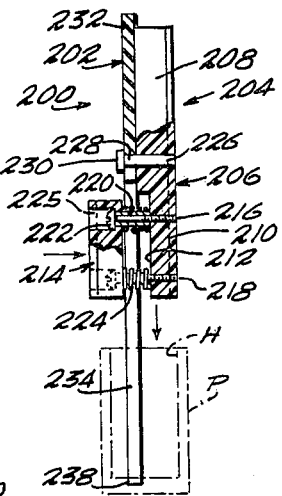
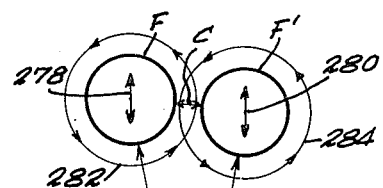
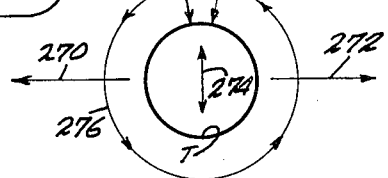
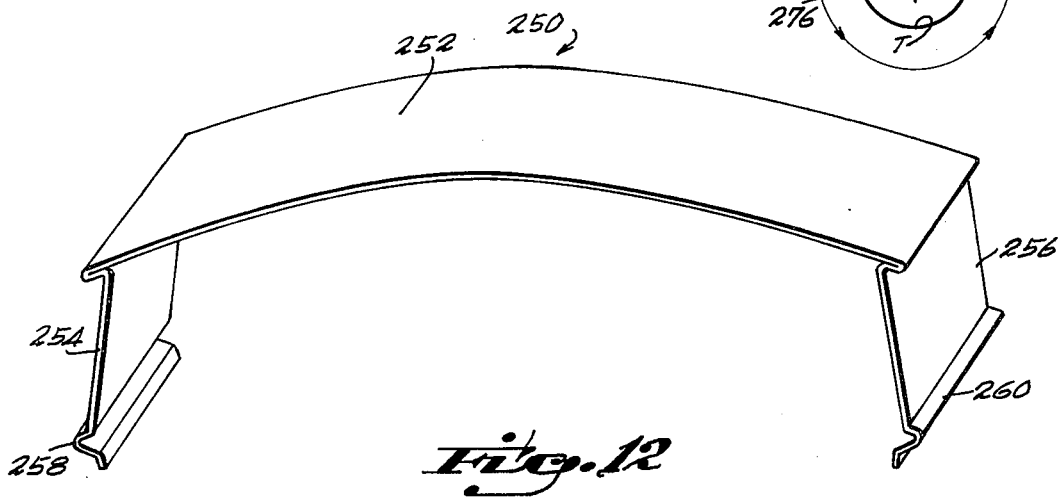

THUMB FINGER HOLE POSITIONING DEVICE FOR BOWLING BALLS

BACKGROUND OF THE PRESENT INVENTION

The present invention pertains to a finger hole positioning device for bowling balls. It is a well known fact that a very large percentage of people who participate in the sport of bowling own their own personal balls which have been custom drilled to provide for proper, comfortable grips to achieve maximum scoring results.

Heretofore, devices of this nature have been provided which provide means to properly position the thumb and finger holes relative to each other along respective radial axes of the devices. However, they do not provide for any angular adjustments relative to the radial axes. Many people are born with slight deformities in their fingers wherein at least one and often more of their fingers are crooked from joint to joint or from the finger tips to the first joints. Some people have one or more crooked fingers as the results of accidents resulting in broken fingers which do not heal in natural aligned conditions. With the presently used finger positioning devices, the angulation of one or more holes to accommodate a like number of crooked fingers must be estimated from a visual observation of the fingers after the proper positioning of the three holes has been determined.

OBJECTS AND ADVANTAGES OF THE PRESENT INVENTION

One of the principal objects of the present invention is to provide a thumb finger hole positioning device for bowling balls, comprised of a bowling ball shaped device having a hollow interior and appropriate cut out wall portions with three receptacles adjustably mounted therein, with plugs, removably disposed in the respective receptacles, provided with holes fitted to the thumb and two fingers of a bowler.

Another object of this invention is to provide a first adjustment means for lateral adjustment of the thumb hole receptacle along a rod transversely spanning the hollow interior in a fixed diametric relation thereto.

A further object of this invention is to provide a second adjustment means to pivotally adjust the thumb hole receptacle toward and away from the finger hole receptacles.

Yet another object of the present invention is to provide third and fourth adjustment means to individually pivot the pair of finger hole receptacles toward and away from the thumb hole receptacle.

A still further object of this invention is to provide a fifth adjustment means which is individually provided for both of the finger hole and the thumb hole receptacles whereby each of said receptacles may be circularly rocked around a universal ball connection at its inner end and locked in any desired outwardly diverging angular relationship to its normal radial axis.

Another object of the present invention is to provide gauge means to record said angular relationship, said gauge means including scale markings which are compatible with scale means on a conventional bowling ball drilling machine.

A further object of this invention is to provide spring plate means for snap-in engagement in the cut out wall portion between the thumb hole receptacle and the finger hole receptacles to provide hand palm support therebetween.

BRIEF DESCRIPTION OF THE DRAWINGS

FIG. 1 is a top plan view of the thumb and finger hole positioning device for bowling balls of the present invention;

FIG. 2 is a side elevational view of FIG. 1 as seen along line 2—2 of FIG. 1;

FIG. 3 is a side elevational view of FIG. 1 as seen along line 3—3 of FIG. 1;

FIG. 4 is a side elevational view of FIG. 1 as seen along line 4—4 of FIG. 1;

FIG. 10 is a view similar to FIG. 4 with a gauge means engaged with the thumb hole and the outer surface of the finger hole positioning device of the present invention;

FIG. 11 is a vertical sectional view through the gauge means of FIG. 10, removed from the positioning device and illustrated partially in elevation;

FIG. 12 is a perspective view of a typical spring metal filler clip of the present invention; and FIG. 13 is a schematic illustration of a typical thumb and finger hole arrangement for a bowling ball, illustrating the universal positioning adjustments of the three holes relative to each other.

DETAILED DESCRIPTION OF THE DRAWINGS

Figure 5:
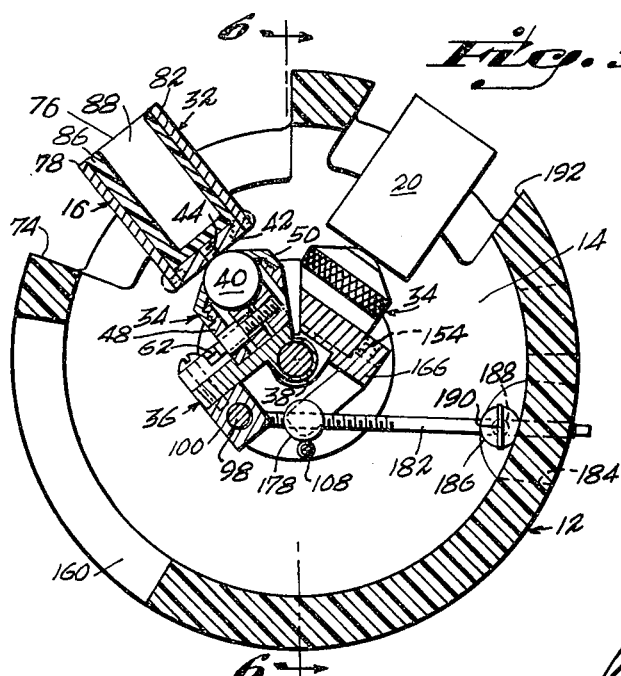
FIG. 5 is a cross sectional view taken generally along line 5—5 of FIG. 1.

With reference to the drawings in which like reference characters designate like or corresponding parts throughout the various views and with particular reference to FIGS. 1 through 4, the thumb and finger hole positioning device for bowling balls of the present invention is indicated generally at 10 and includes an outer spherical shell 12, sized to conform with a conventional bowling ball. An interior chamber 14 is defined by the shell 12 and an adjustable thumb hole positioning assembly 16 and a pair of finger hole positioning assemblies 18 and 20 are adjustably carried in chamber 14. All three of the assemblies 16, 18 and 20 normally extend on radial axes, outwardly from a transverse, diametrically disposed rod 22, spanning the chamber 14 and being firmly clamped in place at its opposed end by cap screws 24 and 26. The opposed ends of rod 22 are internally screw threaded to receive said screws 24 and 26.

As illustrated, the spherical shell is formed in two half portions 28 and 30 for assembly purposes and the cap screws 24 and 26 serve to clampingly engage said half portions in assembly in addition to maintaining the rod 22 in its fixed position. A suitable adhesive may also be applied to the abutting annular edges of the half portions 28 and 30.

Figure 7:
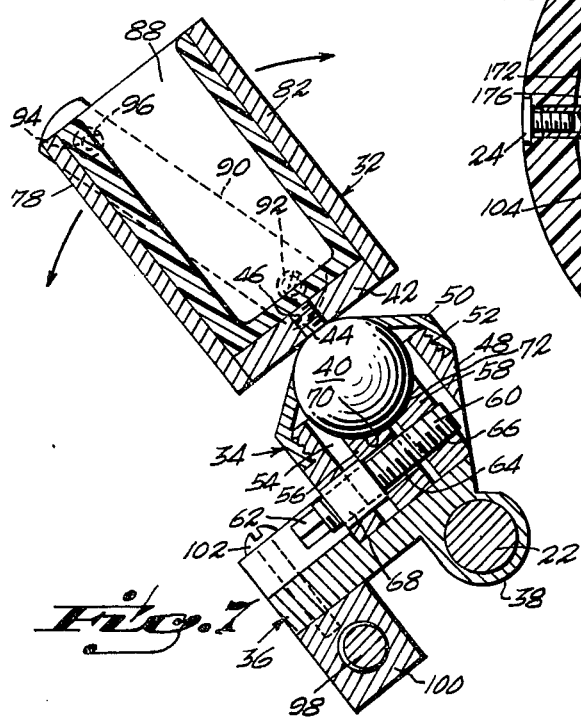
FIG. 7 is an enlarged cross sectional view of the thumb receptacle assembly and its mounting means as seen in FIG. 5.
Figure 6:
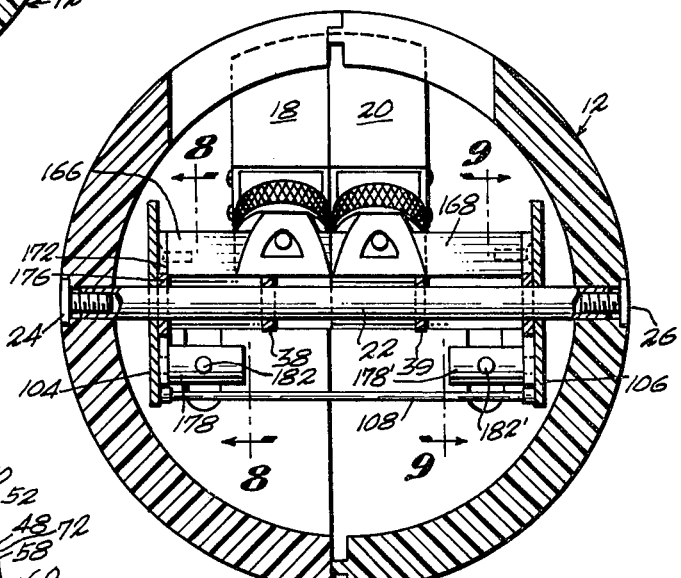
FIG. 6 is a cross sectional view taken along line 6—6 of FIG. 5.

With reference to the thumb hole positioning assembly 16 as best illustrated in FIGS. 1, 5 and 7, it is comprised generally of an outwardly extending receptacle 32 and a ball joint housing 34 fixed to a carriage plate 36 by a set screw (not shown). The plate 36 is rotatably, slidably journaled on the rod 22 by means of a pair of end rings 38 and 39. As seen in FIGS. 5, 6 and 7, said rings 38 and 39 may be formed integral with or be rigidly attached to the plate 36.

A ball 40 is axially fixed outwardly of the bottom wall 42 of the receptacle 32 by means of a screw threaded stud 44, threadably engaged into a suitable hole 46 in said bottom wall 42. The ball joint housing 34 comprises a tubular housing portion 48 and a cap 50 screw threaded at 52 onto the open outer end of housing portion 48 to captivate the ball 40 within the housing chamber 54. Also contained within the chambers 54, beneath the ball 40, are a pair of spaced apart wedge segments 56 and 58. A set screw 60, having a head portion 62 outwardly of housing 34, extends inwardly through the wall of housing portion 48, through a hole 64 in the first wedge segment 56 into screw threaded engagement at 66 through the second wedge segment 58. A collar 68 is rigidly fixed to the outer end portion of set screw 60 in a journaling engagement through the wall of housing portion 48 and in engagement with wedge segment 56. The top faces 70 and 72 of the wedge segments 56 and 58 are preferably, oppositely, inwardly angled or curved to engage and lock the ball in a fixed position when the set screw 60 is actuated inwardly.

When the set screw 60 is actuated outwardly, the locked engagement as above described, relative to ball 40, is released and the receptacle 32 is free to be universally rocked around its normal radially extending axis from rod 22 through ball 40. The receptacle 32 may therefore be locked in any desirable angular position relative to said radial axis by means of the set screw operated lock segments 56 and 58.

As best seen in FIGS. 1, 2 and 5 an enlarged opening 74 is provided in shell 12 and the receptacle 32 extends therethrough and terminates in an open top end 76 in general conformity with the spherical surface of shell 12. In addition to bottom wall 42, the receptacle 32 is comprised of four side walls 78, 80, 82 and 84.

The cavity defined by the bottom and side walls of receptacle 32 is sized to slidably receive a thumb hole plug 86. Plugs of this nature are conventional in the art and are provided with a wide range of thumb and finger hole sizes 88. In practice, the thumb and two fingers, generally the middle and ring finger, of a person are properly fitted with the plugs which are then inserted into the proper receptacles. Spring-loaded detent means comprised of a leaf spring 90 is fixed by a screw 92 adjacent the lower end of a receptacle such as 32. The upper end of leaf spring 90 carries a detent pin 94, normally engaged through a hole in the receptacle wall into a blind hole 96 in plug 86 to maintain said plug in the receptacle during usage.

Transverse movement of receptacle 32 along rod 22 by means of journal rings 38 and 39 is accomplished by an elongated, transverse screw rod 98 in threaded engagement through a nut 100 fixed by screw means 102 to carriage plate 36.

Figure 8:
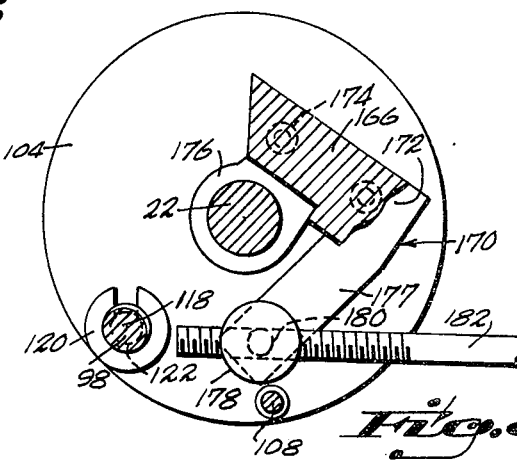
FIG. 8 is an enlarged sectional view taken along 8—8 of FIG. 6.

With particular reference to FIGS. 1, 5, 7, 8 and 9, a pair of opposed side discs 104 and 106 are rotatably journaled on rod 22 and are connected by a tie rod 108, rigidly fixed therebetween. A first end 110 of screw rod 98 extends outwardly through an arcuate slot 112 in the shell 12 and terminates in a square head 114 for engagement by a suitable wrench means. The screw rod 98 passes freely through a hole 116 in side disc 106, then through nut 100 as above described into rotational engagement at its second or inner end through and relative to disc 104. As seen in FIG. 8, the inner end 118 is captivated for said relative rotational engagement by a pair of split rings, one shown at 120, engaged in an annular groove 122 of screw rod 98. A like split ring and groove are provided on the opposite side of disc 104.

Figure 9:
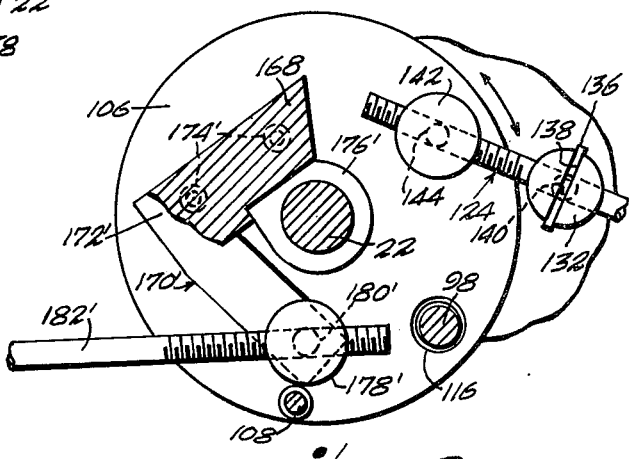
FIG. 9 is an enlarged sectional view taken along line 9—9 of FIG. 6.

Rotational movement of the entire thumb hole positioning assembly 16 about the axis of transverse rod 22 is accomplished by a screw rod 124, see FIG. 9, having an outer end portion 126 passing through a slot 128 (FIG. 4), terminating in a square head 130 for engagement by a wrench. Screw rod 124 extends inwardly through a boss 132, fixed to shell 12 for pivotal movement by a screw 134, FIG. 2. With further reference to FIG. 9, the screw rod 124 is restrained against axial movement by a split ring 136 engaged in a slot 138 in boss 132, about an annular groove 140 in screw rod 124. The inner, screw threaded portion of screw rod 124 is threadably engaged through a nut 142 pivotally carried at 144 by disc 106. Actuation of screw rod 124 will cause rotational movement of both discs 104 and 106 by means of tie rod 108 and elongated screw rod 98. Said rotational movement is transmitted to the thumb hole positioning assembly 16 by the engagement of screw rod 98 with nut 100.

It can therefore be seen that the thumb hole positioning assembly as hereinabove described is transversely adjustable along screw rod 98 and is rotatably adjustable about fixed rod 22 toward and away from the finger hole adjustment assemblies 18 and 20. In addition the receptacle 32 for plug 86 is universably rockable about its normal radially extending axis to achieve any desired locked angular relation thereto.

The finger hole adjustment assemblies 18 and 20, carrying finger hole plugs 150 and 152 are basically the same as the thumb hole assembly 16 as described and will not be described in detail except wherein they differ. Each assembly 18 and 20 includes a universal ball and set screw terminating in an outwardly extending square head 154, FIG. 5, for adjusting the angular relation of receptacles 156 and 158 relative to their normal radially extending axes. The set screw head 52 of thumb receptacle 16 is accessible for adjustment through slot 160, FIG. 4, and the set screw heads 154 of the finger receptacles 18 and 20 are accessible through slots 162 and 164, FIG. 3. In practice, a tool with an elongated handle having a socket wrench attached thereto by a universal connection means is used to accomplish the adjustments.

With particular reference to FIG. 6, the assemblies 18 and 20 are fixed in any conventional manner such as set screws (not shown) to respective, abutting, oppositely extending carriage plates 166 and 168. As the means to rotate both carriage plates 166 and 168 and their respective assemblies 18 and 20 are identical, the means for rotating the carriage plate 166 and assembly 18, as seen in FIG. 5, 6 and 8, will be described in detail.

A generally U-shaped lever means 170 includes a base portion 172, fixed by screws 174 to the outer end of carriage plate 166, a first, short arm terminating in a ring 176 rotatably journaled on transverse rod 22, and a second long arm 177 carrying a nut 178, pivoted at 180 to the outer end portion thereof. An elongated screw rod 182, having an outer end extending through a slot 184 in shell 12, passes through a boss 186, pivotally attached to the shell 12 by a screw 188. The screw rod 182 is restrained against axial movement by a split ring arrangement 190 similar to that described relative to screw shaft 124. The inner portion of screw rod 182 is threadably engaged through nut 178 pivoted at 180 to long arm 177. Actuation of screw rod 182 will therefore cause rotational movement of mounting plate 166 and its associated finger hole assembly 18 about the axis of transverse rod 22.

Like numbers with prime designations have been applied to FIG. 9 in which the lever means 170' accomplishes the individual pivotal movement of mounting plate 168 and its associated finger hole assembly 20 about the axis of transverse rod 22. As best, illustrated in FIGS. 1, 2, 3 and 5 an enlarged opening 192 is provided in shell 12 to accommodate then adjustment movements of finger receptacles 18 and 20.

Referring to FIGS. 10 and 11, gauge means, indicated generally at 200, is provided to indicate on a reference scale the angle of inclination of each of the properly located holes. The gauge means comprises an arch member 202 and a self-adjusting finger assembly 204.

The self-adjusting finger assembly 204 includes an elongated stem 206 including an upper portion 208 and a reduced thickness lower portion 210 formed by an inset 212 on one side thereof. A spring loaded, depressable member 214 is provided in general alignment with said inset 212. Spaced apart screws 216 and 218 extend through the depressable member 214 into threaded engagement with lower portion 210 and a sleeve 20 is engaged about each screw 216 and 218 between the screw head 222 and the face of inset 212. A compression spring 214 is circumposed about each sleeve 220. The head 222 of each screw is normally bottomed in cylindrical opening 225 through the outer wall of the member 214. Therefore, the depressable member 214 may be moved against the forces of springs 224 to engage the lower end portion of finger assembly 204 into any one of a range of thumb or finger hole sizes 14 as in the plug P, illustrated in broken lines. A pin 226 is fixed in the lower end portion of the upper portion 208 of stem 206 and extends forwardly and outwardly, defining a neck portion 228 with a headed terminal end 230.

The arch member 202 includes a central, upwardly extending portion 232 and a pair of oppositely extending, downwardly curved arms 234 and 236, terminating in end portions 238 and 240 in contact with the outer surface of shell 12 in a spanning relation to the diameter thereof. Scale markings 242 are provided on the central upper end portion of the outer face of the extension 232. A central upwardly extending notch 244 in alignment with the central zero marking of scale 242 is adapted to slidably engage over the pin neck 228. Provided centrally of the upper end portion 208 of the stem 206 is a reference line 246 which gives a reading on scale 242 to one side or the other of the zero depending upon the direction of the angle inclination of the plug receptacle.

In practice, additional markings in one-quarter increments are provided on each side of the scale 242, between the zero and the one. Compatible scale means are provided on a conventional, automatic bowling ball hole drilling machine whereby the holes are automatically drilled at their proper angles.

FIG. 12 illustrates a palm support plate 250 and is comprised of an arcuate main body portion 252 with a pair of opposed, downwardly turned spring flanges 254 and 256 which normally diverge somewhat outwardly and include outwardly formed ridges 258 and 260 across their lower edge portions. As illustrated in broken lines in FIG. 2, the palm support may be snapped into place as in opening 74 to form a support thereacross for the palm of the hand during the fitting operation. The palm support 250 may be provided in various widths to accommodate different opening sizes.

FIG. 13 is a schematic illustration of a typical adjustable relationship between the thumb and two finger holes as provided by the device of the present invention. As indicated by arrows 270 and 272 the thumb hole T is transversely adjustable, the double headed arrow 274 indicates the rotational adjustability thereof toward and away from the finger holes F and F', and the circular arrows 276 indicate the universal angular adjustment thereof relative to its normal radial axis as previously described.

The double headed arrows 278 and 280 indicate the individual rotational adjustability of the respective finger holes F and F' toward and away from the thumb hole T, and the circular arrows 282 and 284 indicate the universal angular adjustments of the respective finger holes F and F' relative to their respective normal radial axes as described relative to the thumb hole T.

After the positions and angulations of the three holes have been accurately determined, bridge measurements are made along lines A, B and C. An automatic bowling ball drilling machine is then conditioned in accordance with the measurements and angles and the drilling operation is automatically performed.

What is claimed is:

1. A thumb and finger hole positioning device for bowling balls including means whereby each individual bowling ball may be fitted to the physical characteristics of an individual's bowling hand comprising:
   a bowling ball shaped device (10) providing a spherical shell (12) defining an interior chamber (14);
   three receptacles each with an outwardly facing opening located in said chamber including a thumb hole receptacle (32) and two finger hole receptacles, spaced from said thumb hole receptacle;
   a first enlarged opening (74) in said shell surrounding the outwardly facing opening of said thumb hole receptacle (32);
   a second enlarged opening in said shell surrounding the outwardly facing openings of said finger hole receptacles;
   a first adjustment means (98) to transversely adjust the position of said thumb hole receptacle (32);
   a second adjustment means (124) to pivotally adjust said thumb hole receptacle toward and away from said two finger hole receptacles;
   third and fourth adjustment means for the respective finger hole receptacles to individually pivot said two finger hole receptacles toward or away from said thumb hole receptacle;
   a fifth adjustment means comprised of like individual adjustment means for said thumb hole receptacle and each of said two finger hole receptacles comprising a universal ball joint connection (34) at the inner end of each of said three receptacles carried by individual support means journaled on a fixed, transverse rod (22), diametrically spanning said chamber, so that the outwardly facing opening of each of said receptacles may be rocked about said universal ball joint connection, and locking means to lock each receptacle in any desired outwardly diverging angular relationship to a radial axis passing through said receptacle.

2. The device as defined in claim 1 including access slots through said shell for operation of all of said adjustment means.

3. The device as defined in claim 1 including a palm support plate for snap-in engagement across the open area of said first enlarged opening, between said thumb and two finger sockets.

4. The device as defined in claim 3 wherein said palm support plate comprises an arcuate main body portion and a pair of opposed, generally inwardly angled spring flanges with outwardly formed ridges across their lower edge portions.

5. The device as defined in claim 1 wherein each of said receptacles having a bottom wall, each of said ball joint connections comprises a ball, fixed inwardly of the bottom wall of one of said receptacles on a radial axis passing through said receptacle, said ball being captivated in a housing fixed to said support means.

6. The device as defined in claim 5 wherein each of said receptacles is locked in said desired angular relationship by means of a pair of spaced apart wedge segments slidably carried in said housing and a set screw means operable to draw said wedge segments into locking engagement with said ball or out of engagement therewith.

7. The device as defined in claim 1 wherein said first adjustment means comprises a receptacle nut (100), fixed to said thumb hole receptacle support means, engaged by an elongated screw rod (98) generally spanning said interior chamber and being fixed for rotational movement only, to transversely adjust the position of said thumb hole receptacle along said transverse rod (22) upon actuation of said screw rod (98).

8. The device as defined in claim 7 including a pair of spaced apart discs (104, 106) rotatably journaled on said transverse rod (22) adjacent the respective ends thereof and including a tie rod (108), rigidly fixed between said discs.

9. The device as defined in claim 8 wherein said screw rod (98) passes through a hole (116) in a first of said discs (106) and extends through said receptacle nut (100) transversely across said interior chamber and through said second disc (104) and including split ring means (120) engaged in companionate annular grooves (122) in said screw rod (98), on opposite sides of said second disc, said receptacle nut and its associated thumb hole receptacle being threadably movable between said pair of discs by said screw rod (98).

10. The device as defined in claim 9 wherein said second adjustment means comprises a pivotal nut (142), pivotally carried by a first of said discs, and a second screw rod (124) having restraining means (136) to restrain said second screw rod (124) to rotational movement only, said second screw rod (124) being in engagement with said pivotal nut (142), the rotation of said second screw rod (124) acting to rotate said pair of discs to cause rotation of said thumb hole receptacle about said transverse rod (22).

11. The device as defined in claim 10 including a boss (132) with a slot (138) said second screw rod (124) being restrained to rotational movement by means of a split ring (136), engaged in said second screw rod (124) and in said slot (138) said second screw rod being journaled in said boss (132), said boss being rotatably fixed to said shell (12) within said chamber (14).

12. The device as defined in claim 1 wherein each of said third and fourth adjustment means comprises a lever (170) with a lever arm end (180) and connecting means (166, 176) connected to said lever (170) journaled on said transverse rod (22), a third screw rod mounted for rotational movement with respect to said shell, and being engaged through a second nut, pivotally connected to said lever arm end (180) so as to pivot said finger hole receptacle toward or away from said thumb hole receptacle upon proper actuation of said third screw rod.

13. The device as defined in claim 3 including means to gauge said outwardly diverging angular relationship relative to a radial axis.

14. The device as defined in claim 4 wherein said means to gauge includes a finger assembly having a self-adjusting lower end portion for insertion into any of said three holes, an upper, outwardly extending portion in alignment with a hole in which it is inserted, a reference line at the top thereof and a pin, fixed in the lower end portion of said upper portion, extending forwardly and outwardly a predetermined distance, defining a neck portion, and terminating in an enlarged head.

15. The device as defined in claim 13 wherein said means to gauge includes an arch member comprised of a central, upwardly extending extension, a pair of oppositely extending, downwardly curved arms, terminating in end portions in contact with the outer surface of said shell in a spanning relation to the diameter thereof, scale markings in the central zone of upward extension adjacent the upper end thereof, and a centrally disposed upwardly extending notch in the lower edge of said arch member, in alignment with a central zero mark of said scale markings, for engagement over said neck portion with said end portions in diametric contract.

* * * * *